US011939978B2

(12) United States Patent
Blumhardt (10) Patent No.: US 11,939,978 B2
(45) Date of Patent: Mar. 26, 2024

(54) MACHINE FOR DEPRESSURIZING OR COMPRESSING GASEOUS MEDIA

(71) Applicant: BITZER Kuehlmaschinenbau GmbH, Sindelfingen (DE)

(72) Inventor: Marcus Blumhardt, Rutesheim (DE)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 73 days.

(21) Appl. No.: 17/392,470

(22) Filed: Aug. 3, 2021

(65) Prior Publication Data

US 2021/0363989 A1 Nov. 25, 2021

Related U.S. Application Data

(63) Continuation of application No. PCT/EP2020/052313, filed on Jan. 30, 2020.

(30) Foreign Application Priority Data

Feb. 5, 2019 (DE) .......................... 102019102819.1
Mar. 29, 2019 (DE) .......................... 102019108188.2

(51) Int. Cl.
*F04C 18/16* (2006.01)
*F04C 29/02* (2006.01)

(52) U.S. Cl.
CPC .............. *F04C 18/16* (2013.01); *F04C 29/02* (2013.01); *F04C 2210/22* (2013.01);
(Continued)

(58) Field of Classification Search
CPC ...... F04C 18/123; F04C 18/126; F04C 18/16; F04C 23/001; F04C 23/008; F04C 2/16;
(Continued)

(56) References Cited

U.S. PATENT DOCUMENTS 4,291,547 A * 9/1981 Leo .......................... F25B 1/047
62/505
4,915,514 A * 4/1990 Soderlund ............. F16C 19/545
384/616

(Continued)

FOREIGN PATENT DOCUMENTS

DE 1770399 U 7/1958
DE 2243830 A1 3/1973
(Continued)

OTHER PUBLICATIONS

Machine Translation JPS 57153986 (Year: 2023).*
U.S. Appl. No. 17/392,476, Repentin et al., filed Aug. 3, 2021.

Primary Examiner — Shafiq Mian
Assistant Examiner — Dapinder Singh
(74) Attorney, Agent, or Firm — Reinhart Boerner Van Deuren P.C.

(57) ABSTRACT

In order to improve a machine for depressurizing or compressing substantially gaseous media, comprising a machine casing and at least one screw rotor, which is arranged in a screw rotor bore in the machine casing, extends between a low-pressure side and a high-pressure side of the screw rotor bore, cooperates with the substantially gaseous medium and is mounted on both sides in the machine casing by means of a respective bearing set, and a motor/generator unit that is coupled or couplable to the at least one screw rotor, it is proposed that the at least one screw rotor should be provided with at least one axial support bearing that axially supports the at least one screw rotor such that a high-pressure end face of the at least one screw rotor is guided, without making contact, to an end wall, which faces this end face, of the machine casing that receives the at least one screw rotor.

18 Claims, 8 Drawing Sheets

(52) U.S. Cl.
CPC ...... *F04C 2240/20* (2013.01); *F04C 2240/50* (2013.01); *F04C 2240/81* (2013.01); *F04C 2270/052* (2013.01)

(58) Field of Classification Search
CPC .......... F04C 25/02; F04C 29/12; F04C 29/00; F04C 29/0007; F04C 29/0014; F04C 2220/12; F04C 2240/81; F04C 2270/185; F04C 2270/585; F04C 2280/02; F01C 1/16

See application file for complete search history.

(56) References Cited

U.S. PATENT DOCUMENTS

| | | | |
|---|---|---|---|
| 5,246,357 A | | 9/1993 | Sjoholm et al. |
| 5,411,388 A | * | 5/1995 | Soderlund ............... F01C 21/02 418/203 |
| 6,048,101 A | * | 4/2000 | Rasmussen ........... F16C 25/083 384/616 |
| 2002/0037229 A1 | | 3/2002 | Sjoholm et al. |
| 2004/0170512 A1 | | 9/2004 | Yannascoli et al. |
| 2013/0108495 A1 | | 5/2013 | Bakkestuen et al. |
| 2016/0097572 A1 | * | 4/2016 | Feller ...................... F04C 18/16 418/201.1 |
| 2016/0312782 A1 | | 10/2016 | Shoulders |

FOREIGN PATENT DOCUMENTS

| | | |
|---|---|---|
| DE | 3708200 A1 | 10/1988 |
| DE | 2844940 C2 | 1/1990 |
| DE | 102009038937 A1 | 3/2011 |
| DE | 102013002049 A1 | 8/2014 |
| DE | 112013006890 T5 | 12/2015 |
| DE | 102016216720 A1 | 3/2018 |
| EP | 2161471 A1 | 3/2010 |
| FR | 2976136 A1 | 12/2012 |
| GB | 2006343 B | 2/1982 |
| JP | S57153986 A | 9/1982 |
| JP | S62195481 A | 8/1987 |
| JP | 2004340014 A | 12/2004 |
| JP | 2016007113 A | 1/2016 |
| WO | WO 2004/005939 A1 | 1/2004 |
| WO | WO 2014121894 A1 | 8/2014 |
| WO | WO 2016099746 A1 | 6/2016 |

* cited by examiner

MACHINE FOR DEPRESSURIZING OR COMPRESSING GASEOUS MEDIA

CROSS-REFERENCE TO RELATED PATENT APPLICATIONS

This application is a continuation of International application number PCT/EP2020/052313 filed on Jan. 30, 2020.

This patent application claims the benefit of International application No. PCT/EP2020/052313 of Jan. 30, 2020 and German applications No. 10 2019 102 819.1, filed Feb. 5, 2019 and No. 10 2019 108 188.2, filed Mar. 29, 2019, the teachings and disclosure of which are hereby incorporated in their entirety by reference thereto.

BACKGROUND OF THE INVENTION

The invention relates to a machine for depressurizing or compressing substantially gaseous media, comprising: a machine casing; at least one screw rotor, which is arranged in a screw rotor bore in the machine casing, extends between a low-pressure side and a high-pressure side of the screw rotor bore, cooperates with the substantially gaseous medium and, by rotating about a screw axis, conveys the substantially gaseous medium either from the low-pressure side to the high-pressure side, compressing it, or from the high-pressure side to the low-pressure side, depressurizing it, and is mounted on both sides in the machine casing by means of a respective bearing set, wherein each bearing set has at least one radial bearing and at least one of the bearing sets has at least one axially acting bearing that supports the at least one screw rotor axially to counter axial displacement from its operating position in the direction of the low-pressure side; and a motor/generator unit that is coupled or couplable to the screw rotor.

Machines of this kind are known from the prior art.

These have the problem that the axially acting bearings only support the screw rotors axially to counter displacement in the direction of the low-pressure side but not in the direction of the high-pressure side, so during a switch-on or switch-off procedure, or in the event of an interruption to operation or an incorrect direction of rotation, the problem arises that, if the usually prevailing sealing gap becomes smaller, the screw rotors come into abutment with the machine casing on the high-pressure side, become hot as a result, and are consequently damaged.

It is therefore the object of the invention to improve a machine of the type mentioned in the introduction such that problems of this kind no longer arise.

SUMMARY OF THE INVENTION

According to the invention, this object is achieved with a machine of the type mentioned in the introduction in that the at least one screw rotor is provided with at least one axial support bearing that axially supports the at least one screw rotor such that a high-pressure end face of the at least one screw rotor is guided, without making contact, to an end wall, which faces this end face, of the machine casing that receives the at least one screw rotor.

Here, the end face of the screw rotor on the high-pressure side is formed by an end face or a closure of a screw contour of the screw rotor.

Thus, the advantage of the solution according to the invention can be seen in the fact that the provided axial support bearing makes it possible to maintain a minimum sealing gap between the end face of the screw rotor and the end wall of the machine casing even in unfavorable operating conditions, and thus to avoid damage to the screw rotors and/or the casing as a result of contact between the end face of the screw rotor and the end wall of the machine casing.

Here, in the solution according to the invention the at least one axial support bearing could be arranged to be stationary in the axial direction in the machine casing, wherein the arrangement of the axial support bearing would then necessitate very precise positioning thereof in the machine casing in order to maintain the required minimum sealing gap between the end face of the screw rotor and the end wall of the machine casing.

A particularly advantageous solution provides for the at least one axial support bearing to be arranged to be movable in the axial direction in the machine casing and such that it is urged by force in the direction of the low-pressure side.

This solution has the advantage that, as a result of the movably arranged support bearing being urged by force, the support bearing is in a position to act on the at least one screw rotor such that the screw rotor is guided in the direction of the low-pressure side by the axially acting bearing such that there is substantially no axial play at all, with the result that in all operating conditions the at least one screw rotor is guided in the machine casing in its provided operating position with the provided minimum sealing gap on the high-pressure side.

The most diverse possibilities would be conceivable as regards the urging by force of the at least one support bearing.

For example, a displacement drive, for example actuated by oil pressure, could act on the support bearing.

A particularly simple and favorable solution provides for the at least one support bearing to be urged by a resilient spring force acting in the axial direction, such that the spring force acts in particular permanently on the at least one screw rotor in the direction of the low-pressure side.

In particular, this makes it possible for the at least one support bearing to act on the screw rotor in the axial direction such that the axially acting bearing is constantly biased in the direction of the low-pressure side by the support bearing and thus as a whole provides precise axial guidance of the at least one screw rotor.

A particularly simple solution provides for the support bearing to be urged by a disk spring set.

More detailed statements have not yet been made as regards the location at which the support bearing acts on the at least one screw rotor.

For example, an advantageous solution provides for the at least one support bearing to act on a bearing pin on which the at least one screw rotor is mounted.

Here, the support bearing could be configured to act on different sides of the screw rotor.

A particularly advantageous solution provides for the at least one support bearing to act on the bearing pin that is arranged on the side of the at least one screw rotor that is remote from the motor/generator unit.

This results for example in the support bearing acting on the bearing pin that is arranged on the high-pressure side, when the screw rotor is driven on the low-pressure side.

Moreover, a solution that is particularly advantageous from a structural point of view provides for the at least one support bearing to be arranged in a bearing casing of the machine casing that is arranged such that it is remote from the motor/generator unit.

Further, a favorable solution provides for the at least one support bearing to act on a bearing pin that projects beyond the high-pressure side of the screw rotor.

In principle, it would be possible to arrange the at least one support bearing on the pin section of the screw rotor on which the bearing set is also arranged.

However, a solution that saves on space provides for the at least one support bearing to be arranged on a receiving pin.

It is a simple matter to give a receiving pin of this kind a flexible form in relation to the bearing pin that carries the bearing set, such that it is possible in particular to arrange the receiving pin in a space-saving manner with the support bearing arranged thereon.

Here, a favorable solution provides for the receiving pin to be arranged at an end of a bearing pin.

Here, it is particularly favorable if the radial extent of the receiving pin relative to the respective screw axis is smaller than that of the bearing pin.

Further, it is favorable for support of the at least one support bearing if the receiving pin has a flange face on which the support bearing can act in order to urge the at least one screw rotor the appropriate direction.

In principle, the receiving pin could be integrally formed on the bearing pin in one piece.

However, a solution in which the receiving pin is inserted into the end of the bearing pin is particularly advantageous.

In this case, in particular the solution according to the invention can be retrofitted to existing machines or existing structures in a simple manner.

Here, the receiving pin could be inserted into the end of the bearing pin and connected thereto by any type of join.

However, a particularly simple and advantageous solution provides for the receiving pin to be screwed into the end of the bearing pin.

In order further to ensure that the receiving pin is centered in relation to the bearing pin in the optimum possible manner, it is preferably provided for the receiving pin to be fixed in relation to the bearing pin by a centering cone.

A centering cone of this kind is provided for example both on the receiving pin and/or as a conical centering face on the bearing pin, with the result that the two conical faces enable optimal centering of the receiving pin.

A solution that is particularly favorable from a structural point of view provides for the receiving pin to have a smaller diameter than a pin section of the bearing pin that carries the bearing set, in particular the radial bearing and/or the axially acting bearing.

More detailed statements have not been made in conjunction with the explanation above of the individual exemplary embodiments as regards the dimension of the support bearing.

For example, an advantageous solution provides for the at least one support bearing to be dimensioned such that the support forces to be taken up thereby are in the range of from 10% to 80% of the support forces of the axially acting bearing.

As a result, it is possible to provide in particular a low-cost installation that saves on space and, given the low power dissipation, has low friction.

An even more advantageous dimensioning provides for the at least one support bearing to have, in relation to the respective screw axis, a radial extent in the range of from 20% to 70% of the radial extent of the axially acting bearing.

Within the scope of the solution according to the invention, it is also possible to provide two support bearings for each screw rotor, either both on the high-pressure side or both on the low-pressure side, or one on the high-pressure side and one on the low-pressure side.

It is even better if the support bearing has, in relation to the respective screw axis, a radial extent in the range of from 30% to 60% of the radial extent of the axially acting bearing.

A further advantageous dimensioning provides for the support bearing to have a bearing internal diameter that is smaller than an internal diameter of the axially acting bearing, in particular being in the order of 20% to 80% of the internal diameter of the axially acting bearing.

An advantageous embodiment of the expansion/compression machine according to the invention provides for it to have two screw rotors that are arranged in screw rotor bores and engage in one another by means of their screw contours, wherein a support bearing is associated with at least one of the screw rotors.

However, it is particularly favorable if at least one support bearing is associated with each screw rotor.

Further, an advantageous dimensioning provides for the at least one support bearing to have a bearing internal diameter that is smaller than an internal diameter of the radial bearing, in particular being in the range of from 20% to 80% of the internal diameter of the radial bearing of the bearing sets.

As an alternative or in addition to the solutions described above, according to the invention in a machine of the type mentioned in the introduction the problem of detecting the speed of rotation of the motor generator unit as precisely as possible is solved in that the machine is provided with a rotational speed sensor that is coupled to a shaft rotating proportionally to one of the screw rotors and that takes the form of an electrical sensor generator generating an electrical sensor signal.

The advantage of the solution according to the invention can be seen in the fact that a sensor generator is a simple component that can be coupled to any shaft of the machine according to the invention that rotates proportionally to the rotor of the motor/generator unit in order to generate, as the sensor signal, an electrical voltage permitting the speed of the rotor of the motor/generator unit to be inferred.

In principle, as the electrical signal either a current or a voltage may be used for evaluation.

However, evaluation of a current is more complex since it has to flow through a load and is thus no longer proportional to the speed of rotation of the generator.

For this reason, it is particularly advantageous if, as the electrical sensor signal, a voltage signal is generated that can be detected by a direct voltage measurement and is substantially proportional to the speed of rotation of the motor/generator unit.

Here, a voltage of this kind can be detected in particular in the absence of a significant flow of current and thus without additional circuitry.

Particularly advantageously, the solution according to the invention can be achieved if the sensor generator is arranged in a machine casing of the machine and is exposed in particular therein to the working medium and/or lubricant.

This solution has the great advantage that the sensor generator may be integrated into the machine according to the invention in a simple manner, and moreover has the advantage that, in the integration of the sensor generator, there is no need to take any measures in order to protect it from lubricant and/or the gaseous medium.

A further advantageous solution provides for the sensor generator to have a permanently magnetized sensor rotor that cooperates with a stator having stator windings, wherein, during rotation of the sensor rotor, there is produced at the stator windings of the stator a voltage that is dependent on the speed of the sensor rotor and represents the sensor signal.

This solution is advantageous in particular because the permanent magnetization of the sensor rotor makes the voltage produced in the stator windings substantially proportional, in particular proportional, to the speed of the sensor rotor, with the result that the sensor signal allows the speed of the sensor rotor and thus also the speed of the rotor of the motor/generator unit to be inferred in a simple manner.

Further, it is advantageous if, for the purpose of achieving the permanent magnetization, the sensor rotor has a magnet material comprising rare earth elements, since a magnet material of this kind opens up the possibility of ensuring permanent magnetization of the sensor rotor.

It is particularly favorable if the sensor generator is configured such that, at a speed of rotation of the motor/generator unit that results in a frequency of the AC voltage lying in the range of a grid frequency of a power supply coupled to the motor/generator unit, it generates a voltage in the range between 30 V and 48 V, preferably between 40 V and 48 V.

This solution has the great advantage that generating as high a voltage as possible by means of the sensor generator in the speed range that is relevant for evaluation of the rotational speed of the motor/generator unit improves accuracy of detection without the need to use electrical components that have to be suitable for voltages above 48 V, so the sensor generator and the evaluation electronics equipment may be in the form of low-cost components.

The most diverse possibilities are conceivable as regards installation of the sensor rotor of the sensor generator.

For example, it would be conceivable to couple the sensor rotor to a shaft of the machine according to the invention, in particular the motor/generator unit, by way of a transmission.

A particularly simple solution provides for the sensor rotor of the sensor generator to be coupled directly and non-rotatably to a shaft end and to be carried by it.

This simplifies installation of the sensor generator considerably, since there is no need for any bearing for the sensor rotor, but rather the sensor rotor of the sensor generator is mounted by way of the shaft end, which itself has a bearing.

A particularly favorable solution provides for the sensor rotor of the sensor generator to be arranged on a rotor carrier that is connected to a bearing pin of the screw rotor.

So that the rotor carrier can be mounted in a simple manner, it has proved particularly favorable if the rotor carrier is connected to the shaft end or the bearing pin by means of a centering screw in order to achieve as precise a centering of the rotor carrier as possible, as a result of which in turn as small a gap between the sensor rotor and the stator as possible is achievable.

Further, it is preferably provided for the rotor carrier to be centered in relation to the shaft end or the bearing pin by means of a centering cone.

In particular, it is preferably provided for the shaft end that is coupled to and carries the sensor rotor, or the bearing pin that carries the sensor rotor, to be guided such that it is centered by a bearing, in particular one of the bearing sets, with the result that the shaft end or the bearing pin itself likewise moves with, and transmits to the sensor rotor, only negligible centering errors.

In particular, it is provided for the shaft end or the bearing pin to extend from the bearing that guides it in centered manner, in particular the bearing of one of the bearing sets, at most over a distance from the bearing that corresponds to a diameter of the shaft end or the bearing pin.

Centering the sensor rotor, in relation to the axis about which it rotates, as precisely as possible is advantageous because—as already mentioned above—this enables a small gap to be achieved between the sensor rotor and the stator, which is in turn required for generating a sensor signal that is as precise and as large as possible.

In the context of the description above of the possible ways to install the sensor generator in the machine according to the invention, only the fact that the sensor generator should rotate at a speed of rotation of the machine that is proportional to the rotor of the motor/generator unit was specified.

An advantageous solution provides for the sensor generator to be arranged in a machine casing of the machine according to the invention.

This solution has the advantage that as a result the sensor generator can be protected in a simple manner and in that case moreover also arranged in a manner directly coupled to the shaft driving it, so there is no need for a feedthrough for the shaft through the machine casing.

Within the machine casing, the sensor generator can then still be arranged in various different casing parts or casing regions thereof.

For example, it is conceivable to arrange the sensor generator in the screw rotor casing, in which case it is preferably provided for the sensor generator to be coupled to a shaft of one of the screw rotor or a bearing pin section of one of the screw rotors.

An alternative possibility provides for the sensor generator to be arranged in a motor/generator casing.

In this case, it is in particular advantageous if the sensor generator is coupled to the generator shaft of the motor/generator unit so that it detects the speed of the rotor directly.

Further, it is preferably provided for the sensor rotor of the sensor generator to be coupled to a shaft end of the generator shaft and carried thereby.

More detailed statements have likewise not yet been made as regards the installation of the stator of the sensor generator.

For example, an advantageous solution provides for the stator of the sensor generator to be held stationary on the machine casing, in particular on a component thereof.

In particular, it is provided for the stator of the sensor generator to be held stationary on a casing element, in particular a casing element that is configured to be demounted from the machine casing.

A particularly favorable solution provides for the sensor generator to be arranged in a bearing casing on the high-pressure side, in which it is then advantageously possible to combine it with the arrangement of the support bearing in a simple manner.

In order to arrange the stator of the sensor generator in a manner that is as easy as possible to maintain and where appropriate also easy to retrofit, it is preferably provided for the stator of the sensor generator to be held stationary on a demountable casing element, for example in a bearing casing cover.

In this way, it is possible to perform maintenance in a particularly simple manner and where appropriate also to retrofit the sensor generator in a simple manner.

Preferably here, the casing element is provided with an electrical terminal feedthrough in order to be able to connect the sensor generator to suitable evaluation electronics equipment in a simple manner for the purpose of determining the speed of rotation.

A particularly favorable solution provides for the sensor rotor of the sensor generator to be non-rotatably coupled to a bearing ring of the corresponding support bearing that is coupled to the at least one screw rotor, with the result that the speed sensor according to the invention can be arranged close to the support bearing or combined with the arrangement of the support bearing in a simple manner.

In particular, in an advantageous solution it is provided for the sensor rotor of the sensor generator to be non-rotatably coupled to a bearing pin on which the at least one support bearing acts.

Thus, the description above of solutions according to the invention comprises in particular the different combinations of features that are defined by the sequentially numbered embodiments below:

1. A machine for depressurizing or compressing substantially gaseous media, comprising: a machine casing (10); at least one screw rotor (36, 38), which is arranged in a screw rotor bore (52, 54) in the machine casing (10), extends between a low-pressure side (62) and a high-pressure side (64) of the screw rotor bore (52, 54), cooperates with the substantially gaseous medium and, by rotating about a screw axis (52, 54), conveys the substantially gaseous medium either from the low-pressure side (62) to the high-pressure side (64), compressing it, or from the high-pressure side (64) to the low-pressure side (62), expanding it, and is mounted on both sides in the machine casing (10) by means of a respective bearing set (92, 94, 96, 98), wherein each bearing set (92, 94, 96, 98) has at least one radial bearing (102) and at least one of the bearing sets (96, 98) has at least one axially acting bearing (104) that supports the at least one screw rotor (36, 38) axially to counter an axial displacing movement from its operating position in the direction (112, 114) of the low-pressure side (62); and a motor/generator unit (132) that is coupled or couplable to the at least one screw rotor (36, 38), wherein the at least one screw rotor (36, 38) is provided with at least one axial support bearing (212, 214) that axially supports the at least one screw rotor (36, 38) such that a high-pressure end face (122, 124) of the at least one screw rotor (36, 38) is guided, without making contact, to an end wall (126, 128), which faces this end face (122, 124), of the machine casing (10) that receives the at least one screw rotor (36, 38).

2. The machine according to embodiment 1, wherein the at least one support bearing (212, 214) is arranged to be movable in the axial direction in the machine casing (10) and such that it is urged by force in the direction of the low-pressure side (62).

3. The machine according to embodiment 2, wherein the at least one support bearing (212, 214) acts on the screw rotor (212, 214) in the axial direction such that the axially acting bearing (104) is constantly biased in the direction of the low-pressure side by the support bearing (212, 214).

4. The machine according to embodiment 3, wherein the at least one support bearing (212, 214) is urged by a resilient spring force acting in the axial direction, such that the spring force acts on the at least one screw rotor (36, 38) in the direction (112, 114) of the low-pressure side (62).

5. The machine according to one of embodiments 2 to 4, wherein the at least one support bearing (212, 214) is urged by a disk spring set (256).

6. The machine according to one of the preceding embodiments, wherein the at least one support bearing (212, 214) acts on a bearing pin (230) on which the at least one screw rotor (36, 38) is mounted.

7. The machine according to embodiment 6, wherein the at least one support bearing (212, 214) acts on the bearing pin (230) that is arranged on the side of the at least one screw rotor (36, 38) that is remote from the motor/generator unit (132).

8. The machine according to embodiment 7, wherein the at least one support bearing (212, 214) is arranged in a bearing casing (18) of the machine casing (10) that is arranged such that it is remote from the motor/generator unit.

9. The machine according to one of embodiments 6 to 8, wherein the at least one support bearing (212, 214) acts on a bearing pin (230) that projects beyond the end face of the screw rotor (36, 38) on the high-pressure side.

10. The machine according to one of the preceding embodiments, wherein the at least one support bearing (212, 214) is arranged on a receiving pin (224).

11. The machine according to embodiment 10, wherein the receiving pin (224) is arranged at an end of a bearing pin (230).

12. The machine according to embodiment 10 or 11, wherein the receiving pin (224) has a flange face (246) on which the support bearing (212, 214) acts.

13. The machine according to one of embodiments 10 to 12, wherein the receiving pin (224) is inserted into the end of the bearing pin (230).

14. The machine according to one of embodiments 10 to 13, wherein the receiving pin (224) is centered in relation to the bearing pin (230) by a centering cone (234, 236).

15. The machine according to one of embodiments 10 to 14, wherein the receiving pin has a smaller diameter than a pin section (93, 95, 97, 99) of the bearing pin (230) that carries the respective bearing set (92, 94, 96, 98), in particular the radial bearing (102) and/or the axially acting bearing (104).

16. The machine according to one of the preceding embodiments, wherein the at least one support bearing (212, 214) is dimensioned such that the support forces to be taken up thereby are in the range of from 10% to 80% of the support forces of the axially acting bearing (104).

17. The machine according to one of the preceding embodiments, wherein the at least one support bearing (212, 214) has, in relation to the respective screw axis (52, 54), a radial extent in the range of from 10% to 80% of the radial extent of the axially acting bearing (104).

18. The machine according to one of the preceding embodiments, wherein the at least one support bearing (212, 214) has a bearing internal diameter that is smaller than an internal diameter of the axially acting bearing (104) of the respective bearing set (92, 94, 96, 98).

19. The machine according to one of the preceding embodiments, wherein the at least one support bearing (212, 214) has a bearing internal diameter that is smaller than an internal diameter of the radial bearing (102) of the bearing sets (92, 94, 96, 98).

20. The machine according to the preamble of embodiment 1 or one of the preceding embodiments, wherein the machine is provided with a rotational speed sensor (270) that is coupled to a shaft (97, 99) rotating proportionally to one of the screw rotors (36, 38) and that takes the form of an electrical sensor generator (272) generating an electrical sensor signal.

21. The machine according to embodiment 20, wherein the electrical sensor generator (272) generates, as the sensor signal, an electrical voltage.

22. The machine according to embodiment 20 or 21, wherein the sensor generator (272) is arranged in a machine casing (10) of the machine and is exposed in particular therein to the working medium and/or lubricant.

23. The machine according to one of embodiments 20 to 22, wherein the sensor generator (272) has a permanently magnetized sensor rotor (274) that cooperates with a stator (276) having stator windings, wherein, during rotation of the sensor rotor (274), there is produced at the stator windings of the stator (276) a voltage that is dependent on the speed of the sensor rotor (274) and represents the sensor signal.

24. The machine according to one of embodiments 20 to 23, wherein, for the purpose of achieving the permanent magnetization, the sensor rotor (274) has a magnet material comprising rare earth elements.

25. The machine according to one of preceding embodiments 20 to 24, wherein the sensor generator (272) is configured such that, at a speed of rotation of the motor/generator unit (132) that results in a frequency of the AC voltage lying in the range of a grid frequency of a power supply coupled to the motor/generator unit, it generates a voltage in the range between 30 V and 48 V, preferably between 40 V and 48 V.

26. The machine according to one of embodiments 20 to 25, wherein the sensor rotor (124) of the sensor generator (122) is coupled directly and non-rotatably to a shaft end (97, 99) and is carried by it.

27. The machine according to one of embodiments 20 to 26, wherein the sensor rotor (274) of the sensor generator (272) is arranged on a rotor carrier (282) that is connected to a bearing pin (230) of the screw rotor (36).

28. The machine according to embodiment 26 or 27, wherein the rotor carrier (282) is connected to the shaft end (97) or the bearing pin (230) by means of a centering screw (134).

29. The machine according to one of embodiments 26 to 28, wherein the rotor carrier (282) is centered in relation to the shaft end (97) or the bearing pin (230) by means of a centering cone (234, 236).

30. The machine according to one of embodiments 20 to 29, wherein the bearing pin (230) that is coupled to and carries the sensor rotor (274) of the sensor generator (272) is guided such that it is centered by a bearing (96, 98).

31. The machine according to embodiment 30, wherein the shaft end (97) or the bearing pin (230) extends from the bearing (96, 98) that guides it in centered manner at most over a distance from the bearing (96, 98) that corresponds to a diameter of the shaft end (97) or the bearing pin (230).

32. The machine according to one of embodiments 20 to 31, wherein the sensor generator (272) is arranged in a bearing casing (18) on the high-pressure side.

33. The machine according to one of embodiments 20 to 32, wherein the stator (276) of the sensor generator (270) is held stationary on a casing element (22) of the machine casing (10), in particular a casing element (22) that is configured to be demounted from the machine casing (10).

34. The machine according to embodiment 33, wherein the casing element (22) is provided with an electrical terminal feedthrough (302).

35. The machine according to one of the preceding embodiments, wherein the sensor rotor (274) of the sensor generator (272) is non-rotatably coupled to a bearing ring (222) of the corresponding support bearing (212, 214) that is coupled to the at least one screw rotor (36, 38).

36. The machine according to one of embodiments 20 to 35, wherein the sensor rotor (274) of the sensor generator (272) is non-rotatably coupled to a bearing pin (230) on which the at least one support bearing (212, 214) acts.

Further features and advantages of the invention form the subject matter of the description below and the representation in the drawing of some exemplary embodiments.

DETAILED DESCRIPTION OF THE INVENTION

Figure 1:
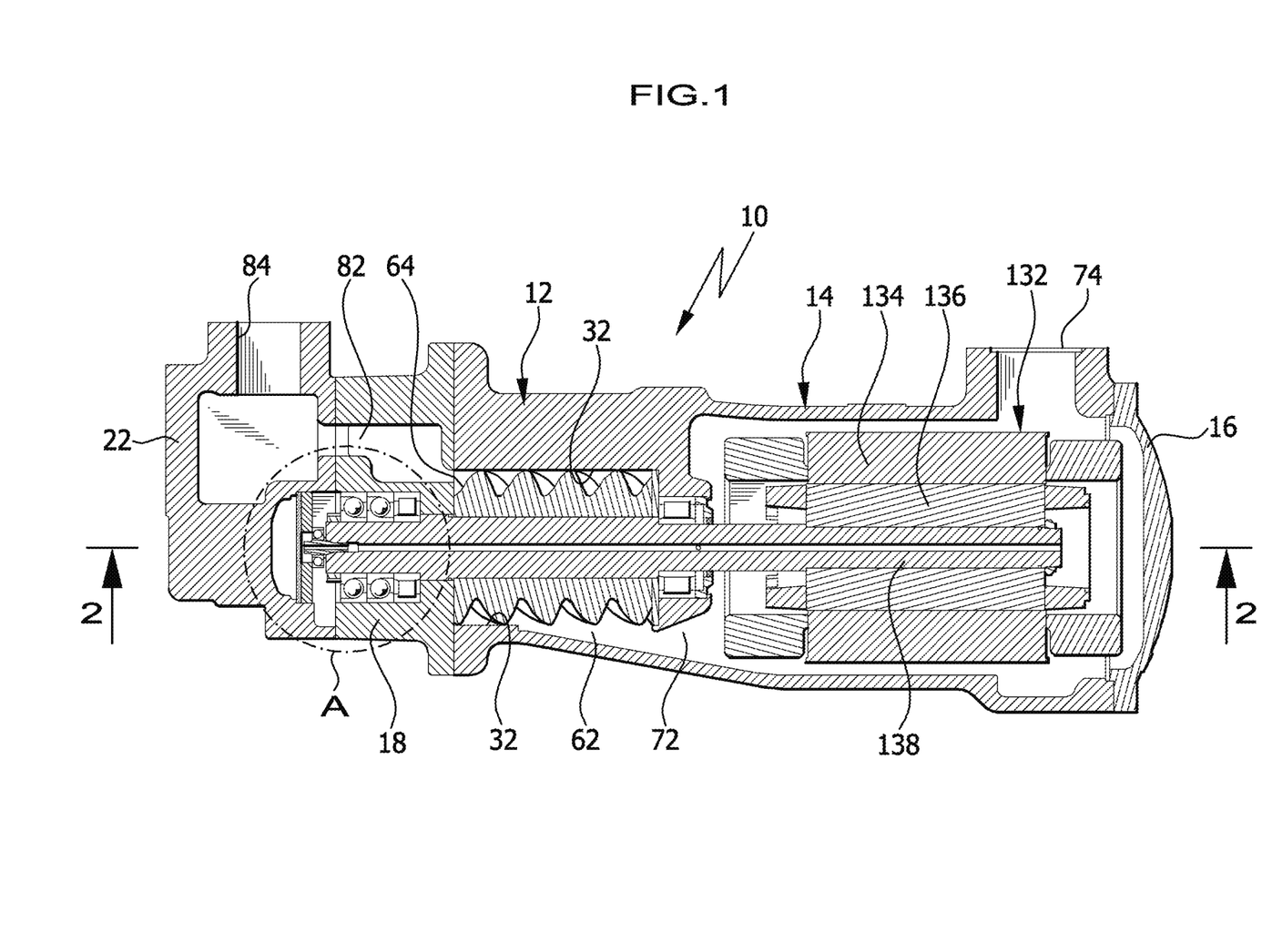
FIG. 1 shows a longitudinal section through a first exemplary embodiment of a machine according to the invention for depressurizing and/or compressing gaseous media.
Figure 2:
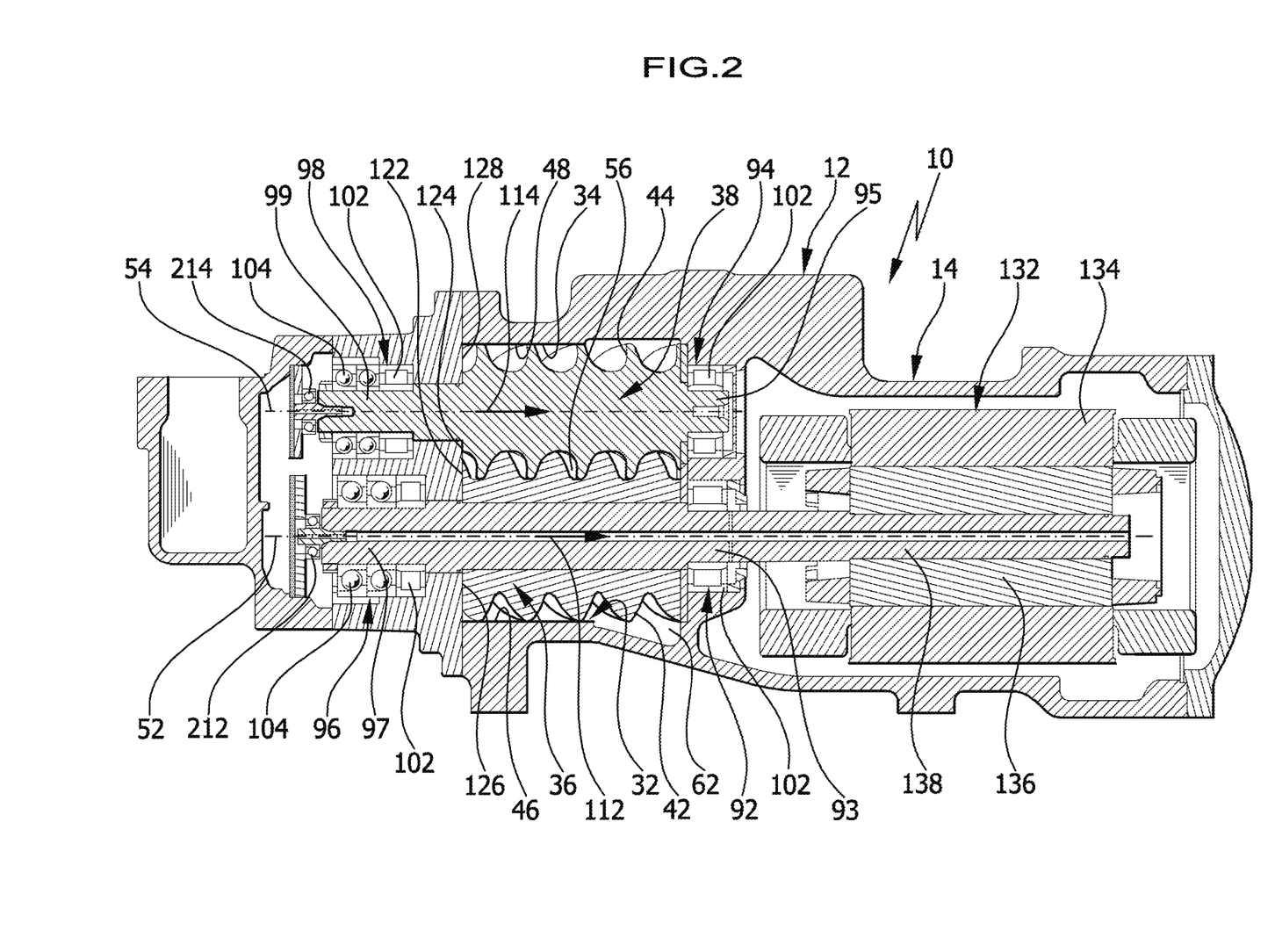
FIG. 2 shows a section along the line 2-2 in FIG. 1.

A first exemplary embodiment of a machine according to the invention, in particular an expansion/compression machine, that is represented in FIGS. 1 and 2 comprises a machine casing that is designated 10 as a whole and is formed by a screw rotor casing 12 adjoined on one side by a motor/generator casing 14, which is closed off by a casing cover 16 on an opposite side to the screw rotor casing 12.

On an opposite side to the motor/generator casing 14, the screw rotor casing 12 is adjoined by a bearing casing 18 that is closed off by a bearing casing cover 22 on the opposite side thereof to the screw rotor casing 12.

Provided in the screw rotor casing 12 are screw rotor bores 32, 34 in which there are arranged screw rotors 36, 38 that engage in one another by means of their screw contours 42, 44 and cooperate with wall faces 46, 48 of the screw rotor bores in order, during rotation about the respective screw axes 52, 54, to form chambers 56 that are enclosed between the screw contours 42, 44 and the wall faces 46, 48, wherein these chambers 56 have the maximum possible volume at a point adjoining a low-pressure side 62 that adjoins the screw rotor bores, and the smallest volume at a point adjoining a high-pressure side 64.

Here, in the exemplary embodiment illustrated, the low-pressure side 62 lies on a side of the screw rotor casing 12 that faces the motor/generator casing 14, wherein the low-pressure side 62 is connected, by a gas path 72 passing through the motor/generator casing 14, to a low-pressure junction point 74 of the machine casing 10, and wherein the low-pressure junction point 74 is preferably arranged close to the casing cover 16 such that the gas path 72 running between the low-pressure junction point 74 and the low-pressure side 62 as far as possible passes through the motor/generator casing 14 over the entire length thereof.

In the exemplary embodiment illustrated, the high-pressure side 64 lies on a side of the screw rotor casing 12 that faces the bearing casing 18, wherein the high-pressure side 64 is adjoined by a high-pressure channel 82 that passes through the bearing casing 18 and the bearing casing cover 22 and leads to a high-pressure junction point 84 of the machine casing 10, which is arranged for example in the bearing casing cover 22.

As illustrated in FIGS. 1 and 2, the screw rotors 36 and 38 are mounted to be rotatable about the respective screw axes 52 and 54 in the overall casing 10, wherein there is provided for each of the screw rotors 36, 38 a respective bearing set 92 and 94 on the low-pressure side, and for each of the screw rotors 36, 38 a bearing set 96, 98 on the high-pressure side.

Each of the bearing sets 92, 94, 96, 98 comprises at least one respective radial bearing 102, and in addition one of the bearing sets 92, 94, 96, 98 for each of the screw rotors 36, 38, for example the respective bearing set 96, 98 on the high-pressure side, also comprises at least one axially acting bearing 104.

The bearing sets 92, 94, 96, 98 are in particular each arranged on a bearing pin section 93, 95, 97, 99 of the respective screw rotor 36, 38.

Here, the axially acting bearings 104 support the screw rotors 36, 38 to counter movement out of their operational position in the direction of the low-pressure side 62, since the pressure difference between the high-pressure side 64 and the low-pressure side 62 acts on the screw rotors 36, 38 such that they tend to move in a directions 112, 114 parallel to the screw axes 52, 54, away from the high-pressure side 64 and toward the low-pressure side 62, and thus to enlarge a sealing gap provided in the operational position between a respective end face 122, 124 of the respective screw rotor 36 and 38—that is to say in particular a closure on the high-pressure side or an end face 122, 124 of the screw contour 42, 44 on the high-pressure side—and an end wall 126, 128 that closes the screw rotor bores 32, 34 on the high-pressure side.

Maintaining the operational position, and thus this sealing gap between the respective end face 122, 124 of the respective screw rotor 36 and 38 respectively, which has a predetermined width and is closed off by an oil film, is required in order to ensure optimal functioning of the machine, and so is predetermined by the action of the axially acting bearings 104 on the screw rotors 36, 38.

The screw rotors 36, 38, which rotate about their screw axes 52, 54, are coupled to an electrical motor/generator unit that is designated 132 as a whole, is provided in the motor/generator casing 14, and has a stator 134, which is arranged fixedly in the motor/generator casing 14, and a rotor 136, which is surrounded by the stator 134 and is seated on a common drive shaft 138 that passes through both the rotor 136 and the screw rotor 36 and is mounted on the bearing sets 92 and 102.

As illustrated in FIGS. 1 and 2, the electrical motor/generator unit 132 is arranged such that the low-pressure channel 72 runs at least in certain regions along the stator 134 but, where appropriate, also runs through between the rotor 136 and the stator 134 in order to cool the electrical motor/generator unit 132 by means of the gas guided on the low-pressure side.

The screw rotor 36 that is coupled to the electrical motor/generator unit 132 is itself also coupled by way of the mutually engaging screw contours 42, 44 to the screw rotor 38, with the result that the chambers 56 that are formed migrate, depending on the direction of rotation of the screw rotors 36, 38, either from the high-pressure side 64 to the low-pressure side 62 and thus depressurize gas that is received on the high-pressure side, which is then present as expanded gas 62 on the low-pressure side, or from the low-pressure side 62 to the high-pressure side 64 and in so doing compress gas received on the low-pressure side, which is delivered on the high-pressure side 64.

Figure 3:
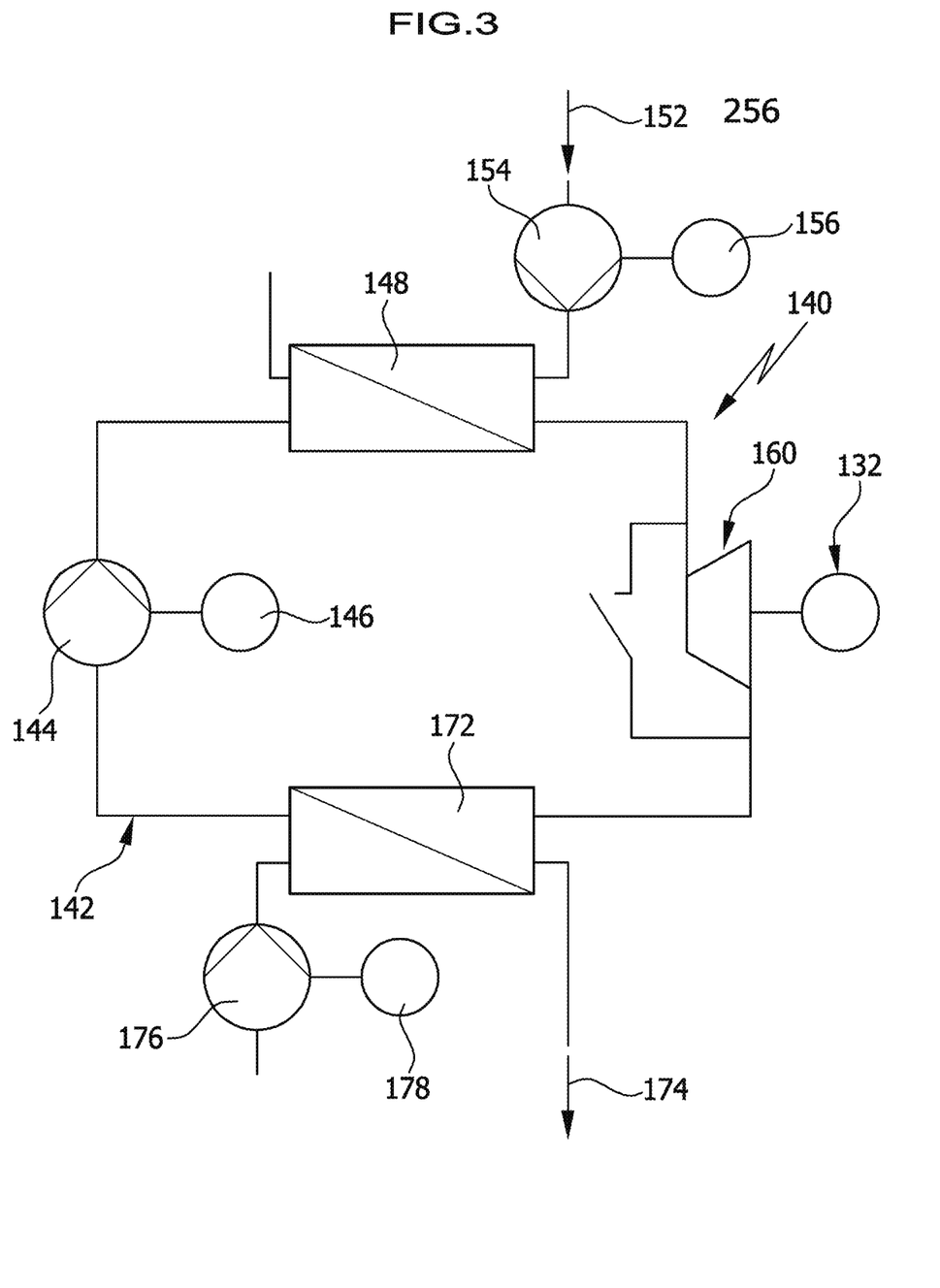
FIG. 3 shows a schematic representation of a circulation procedure using a machine according to the invention for depressurizing gaseous media.
Figure 4:
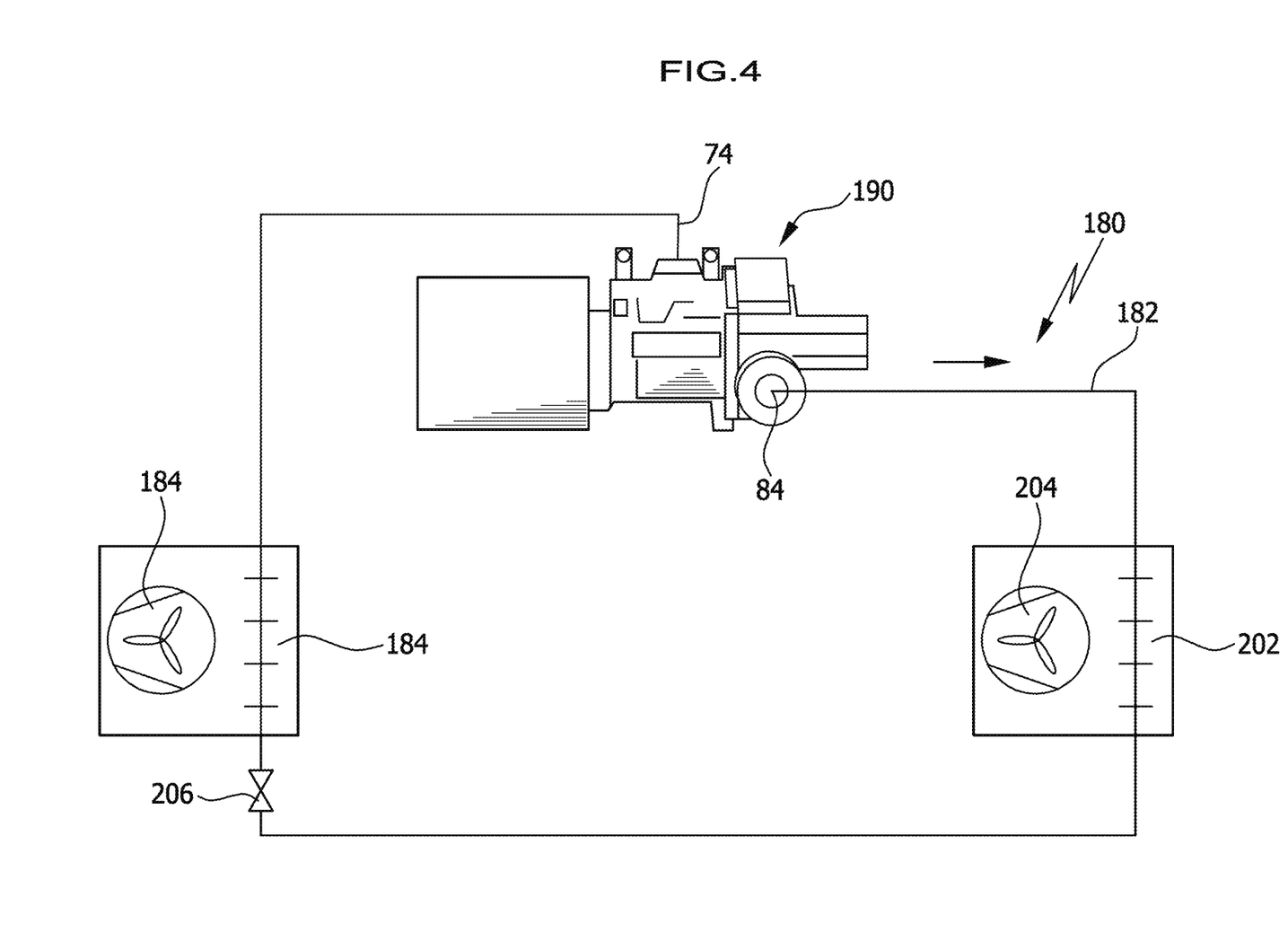
FIG. 4 shows a schematic representation of a refrigerant circuit having a machine according to the invention for compressing gaseous media.

These two different operating modes are illustrated schematically in FIGS. 3 and 4.

FIG. 3 illustrates a circulation procedure, in particular a circulation procedure that operates by a Rankine cycle, which is designated 140 as a whole and in which a working medium that is guided in a circuit 142 is compressed by a compressor 144 that is driven by a motor 146, then flows through a heat exchanger 148 and, as a result of a supply of heat from a heat stream 152, is evaporated, wherein the heat stream 152 is supplied to the heat exchanger 148 for example by means of a hot-water circuit and a hot-water pump 154 having a drive motor 156.

The working medium that is evaporated in the heat exchanger 148 as a result of the supply of the heat stream 152 is then supplied, downstream of the heat exchanger 148 in the circuit 142, to an expansion machine 160 that is formed in accordance with the expansion/compression machine illustrated in FIGS. 1 and 2, wherein the motor/generator unit 132 operates as a generator.

Here, the evaporated working medium is supplied by way of the high-pressure junction point 84 to the expansion machine 160 and arrives between the screw rotors 36, 38 on the high-pressure side 64, is received by the chambers 56 and is depressurized on the path of the chambers 56 to the low-pressure side 62, wherein—depending on the temperature and pressure—drops of liquid may also be formed.

The depressurized working medium is then supplied to a further heat exchanger 172 in which the working medium is condensed and a heat stream 174 is discharged, for example by a cold-water circuit in which a pump 176 driven by a motor 178 is likewise arranged.

However, it is also possible for the heat stream 174 to be discharged a cooling air stream.

In particular, as a result of the pump or the compressor 144 there is isentropic, preferably ideal isentropic, compression of a liquid-saturated condensate of the working medium that is generated by the heat exchanger 172, and substantially isobaric evaporation of the subcooled system takes place in the heat exchanger 148 until the vapor-saturated state is reached, and in this state the working medium is then supplied to the expansion machine 160, as a result of which there is produced in the expansion machine 160 mechanical work that drives the motor/generator unit 132 and thus generates electrical energy.

Thereafter, there is isobaric, in particular completely isobaric, condensation of the working medium in the heat exchanger 172 as a result of discharging the heat stream 174, such that a liquid-saturated condensate can then once again be supplied to the compressor 144.

The expansion/compression machine that is described above and illustrated in FIGS. 1 and 2 may, however, also be used according to FIG. 4 in a circulation procedure 180 with a refrigerant circuit 182 in which a coolant that is heated in a heat exchanger 184 by the discharge of heat, for example by means of a fan 184, is supplied to the low-pressure junction point 74, then compressed by the compressor machine, which is driven by the motor/generator unit 132, on the path from the low-pressure side 62 to the high-pressure side 64, and supplied by way of the high-pressure junction point 84 to a heat exchanger 202 that cools the compressed refrigerant, for example by means of a fan 204, and then supplies it to an expansion member 206 for expansion, from which the expanded coolant is supplied to the exchanger 184 again.

In normal operation, in both the circuit 142 and the refrigerant circuit 182, in the expansion/compression machine the pressure on the low-pressure side 62 is always lower than the pressure on the high-pressure side 64, with the result that in these cases the screw rotors 36, 38 always strive to move their end faces 122, 124 away from the end walls 126, 128 in the directions 112, 114 and to maintain the sealing gap that is predetermined by the axially acting bearings 104.

However, during starting or stopping procedures, or in the event of aborted starting procedures or an incorrect direction of rotation of the motor/generator unit 132, it is possible for conditions to arise in which the forces acting on the screw rotors 36, 38 in the directions 112 and 114 are close to zero or in some cases are even negative.

In these cases, it is possible for the sealing gap to become smaller and hence for the end faces 122, 124 of the screw rotors 36, 38 to come into contact with the end walls 126, 128, resulting in heating, to a certain extent overheating, and consequently damage at the end faces 122, 124 and/or the end walls 126, 128 or the screw contours 42, 44 of the screw rotors 36, 38, since the axially acting bearings 104 are only active in the directions 112 and 114 but not in the directions opposed to the directions 112 and 114.

In order to avoid such conditions, there are associated with the screw rotors 36, 38 axial support bearings 212, 214 that support the screw rotors 36, 38 to counter movement from the low-pressure side 62 to the high-pressure side 64 and to maintain a minimum size of the sealing gap.

Figure 6:
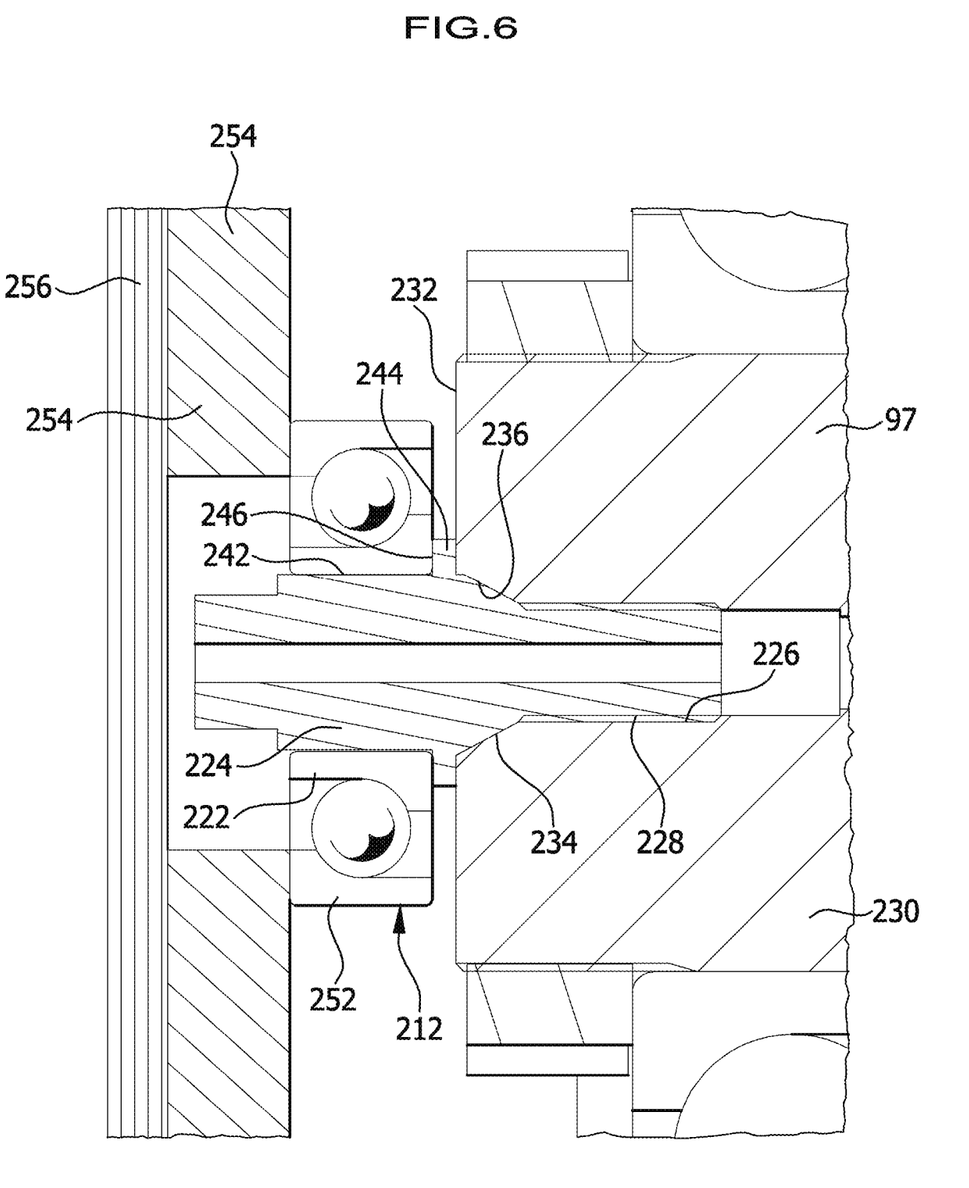
FIG. 6 shows a further enlarged representation of the region illustrated in FIG. 5, representing a support bearing according to the invention.

As can be seen in exemplary manner from the example of the support bearing 212, this has a bearing inner ring 222 that is arranged on a receiving pin 224, wherein the receiving pin 224 is arranged on a bearing pin 230, in particular a bearing pin 230 having the bearing pin section 93, 95, 97, 99 that carries the respective bearing attachment 92, 94, 96, 98.

In particular, the receiving pin 224 is itself screwed by means of a threaded portion 228 into a threaded bore 226 in a bearing pin 230, in this case the bearing pin 230 of the screw rotor 36 that is on the high-pressure side, wherein this threaded bore 226 preferably extends from an end face 232 of the bearing pin 230, coaxially with the respective screw axis 52, and into the bearing pin 230.

In order to achieve optimal centering of the receiving pin 224, the receiving pin 224 is also provided with a centering cone 234 that cooperates with a cone face 236 provided at the point at which the end face 232 merges with the threaded bore 226, such that centering is achieved.

For the purpose of supporting the bearing inner ring 222, the receiving pin 224 is provided with a centering face 242 that radially receives the bearing inner ring 222, and additionally, by means of a support flange 244 projecting radially outward beyond the centering face 242 of the, supports the bearing inner ring 222 by means of a flange face 246 on a side facing the end face 232 of the bearing pin 230.

Figure 5:
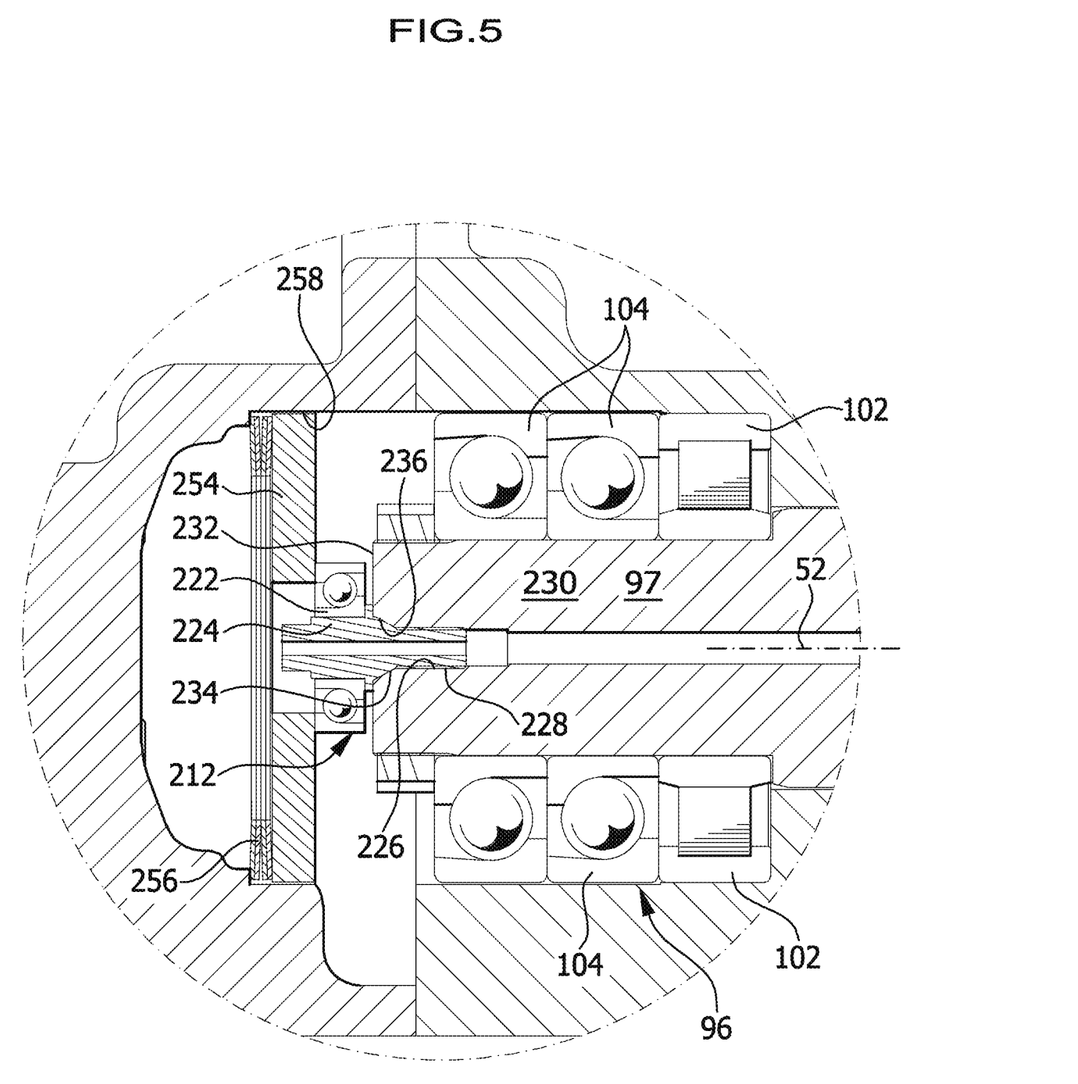
FIG. 5 shows an enlarged representation of a region A in FIG. 1.

Further, each of the support bearings 212, 214 is provided with a bearing outer ring 252 on which there acts a thrust plate 254 which, at a side of the respective support bearing 212, 214 that is opposite the flange face 246 and thus for example also the end face 232 of the bearing pin 230, abuts against the support bearing 212, 214 and is for its part, as illustrated in FIG. 5, centered in the bearing casing 18 relative to the respective screw axis 52, 54 and arranged such that it is guided movably in the direction parallel to the screw axes 52, 54.

This thrust plate 254 is urged by a set of disk springs 256, which, on their side remote from the thrust plate 254, are likewise supported in the bearing casing 18, in particular in a seating 258 provided therein, and act on the thrust plate 254 such that in the region of the bearing outer ring 252 it urges the respective support bearing 212, 214 in the direction of the bearing pin 230, such that as a whole, as a result of the respective support bearings 212, 214, each of the screw rotors 36, 38 is urged by a force that acts parallel to the respective screw axis 52, 54, in the directions 112, 114.

The solution according to the invention thus makes it possible, for example with the use of the receiving pin 224 that is inserted in the respective bearing pin 230 at the end face thereof, to make the support bearings 212, 214 substantially smaller than the radially acting bearings 104 that are seated in each case radially on the pin section 93, 95, 97, 99 of the respective bearing pin 230, resulting in a spatially advantageous solution.

In particular, the support bearings 212, 214 are dimensioned such that their size—for example the external diameter of the bearing outer rings 252—is smaller than a diameter of the bearing pin 230, and in particular lies in the range of from approximately 15% to approximately 80% of the size of the axially acting bearings 104.

Further, the forces that are generated by the disk spring set 256 in the directions 112 and 114 are selected such that they lie in the range of from approximately 2% to approximately 30% of the forces that act on the screw rotors 36, 38 in normal operation of the expansion/compression machine.

The expansion/compression machine that is described above may also be provided in a simplified form, with only one of the support bearings 212, 214, wherein in the case of an expansion machine preferably the support bearing 214 is provided and in the case of a compression machine preferably the support bearing 212 is provided.

Figure 7:
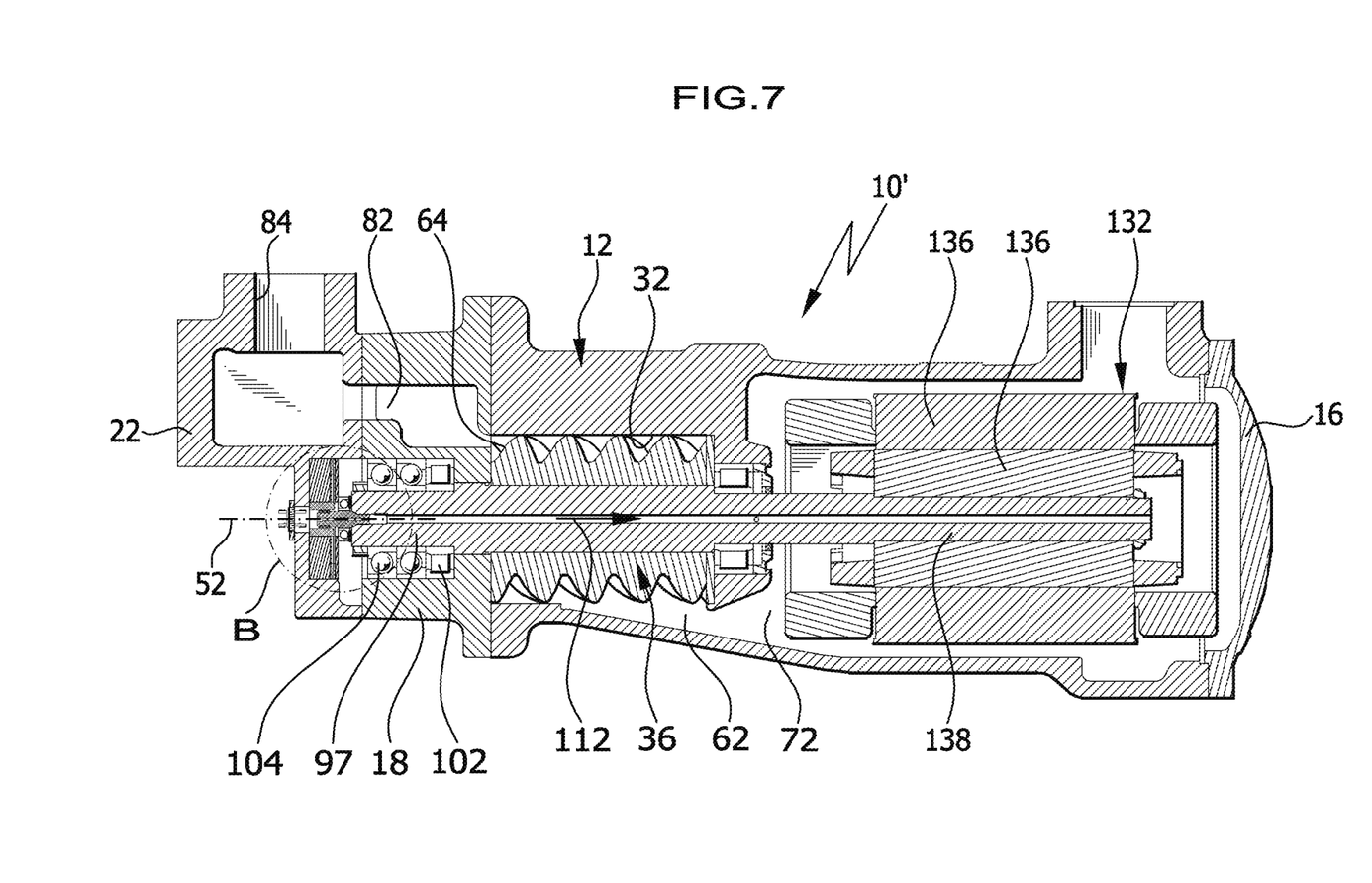
FIG. 7 shows a longitudinal section through a second exemplary embodiment of a machine according to the invention, similar to FIG. 1, for depressurizing and/or compressing gaseous media.
Figure 8:
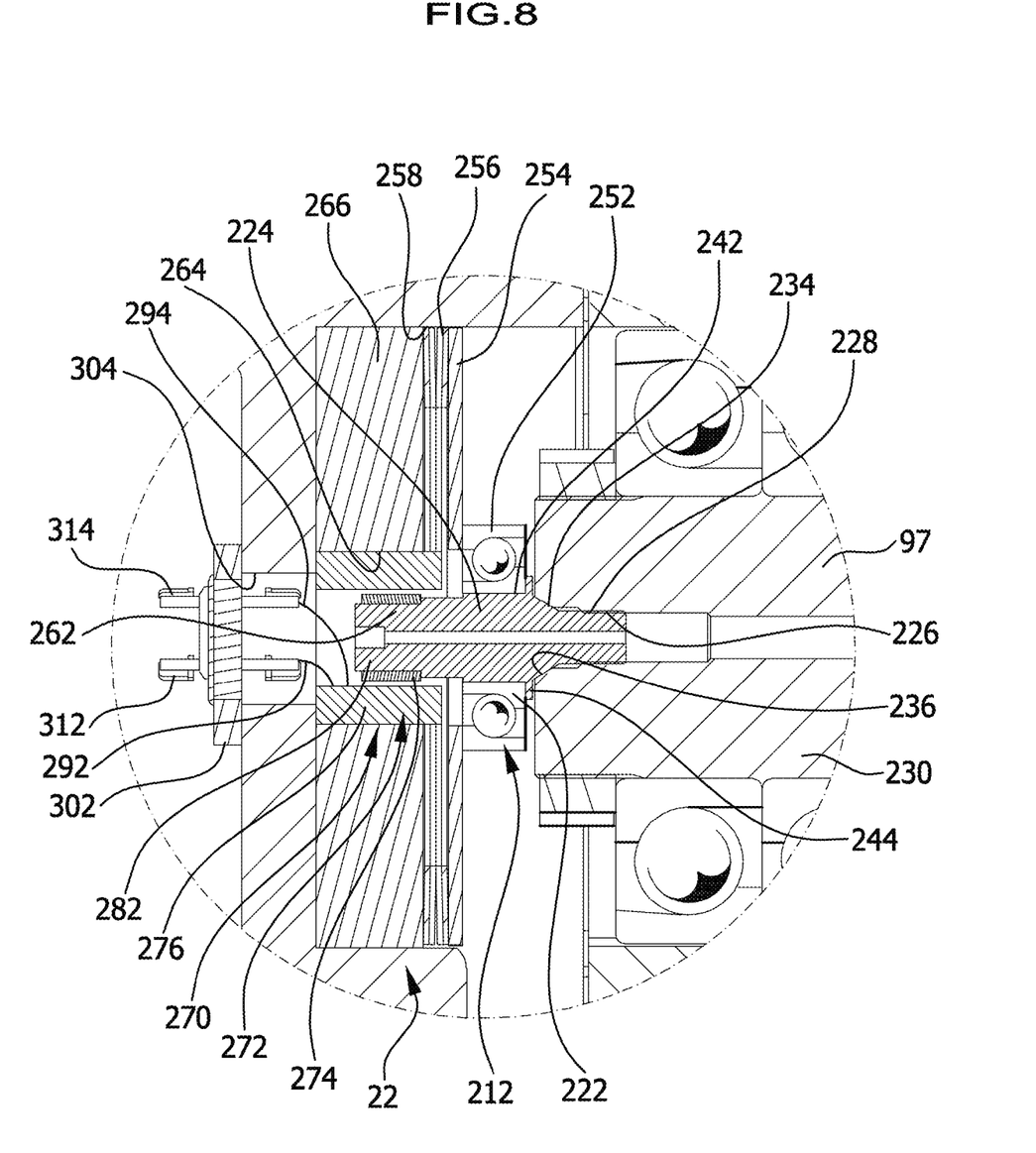
FIG. 8 shows an enlarged representation of the region B in FIG. 7.

In a second exemplary embodiment of an expansion/compression machine according to the invention, illustrated in FIGS. 7 and 8, there are associated with the screw rotors 36, 38, in the same way as in the first exemplary embodiment, axial support bearings 212, 214 that support the screw rotors 36, 38 to counter movement from the low-pressure side 62 to the high-pressure side 64 and to maintain a minimum size of the sealing gap, as already described in the context of the first exemplary embodiment, to which reference is made in its entirety in cases where the same elements are provided with the same reference numerals.

Unlike the first exemplary embodiment, however, the receiving pin 224 is provided with a projection 262 that extends away from the bearing pin 230 of the screw rotor 36 on the high-pressure side and in so doing passes through both the thrust plate 254 and the set of disk springs 256 in a central region, in particular without making contact, and engages in a free space 264 of a support body 266 for the set of disk springs 256.

In this case, the support body 266 may either be a separate part inserted into the bearing casing cover 22, as illustrated in FIG. 8, and, together with the bearing casing cover 22, may form the seating 258 for supporting the set of disk springs 256, or it may be made in one piece in the bearing casing cover 22.

Arranged in the free space 264 is a rotational speed sensor that is designated 270 as a whole and is coupled to the receiving pin 224, which rotates proportionally to the speed of the bearing pin 230 of the screw rotor 36 on the high-pressure side.

In particular, the speed sensor 270 forms an electrical sensor generator 272, which has a permanently magnetized sensor rotor 274 that cooperates with a stator 276 having stator windings, wherein the sensor rotor 274 is arranged such that it is seated fixedly on a rotor carrier 282 formed by the projection 262, with the result that as a whole, because the receiving pin 224 is connected non-rotatably to the bearing pin 230, the sensor rotor 274 rotates at the same speed as the screw rotor 36, while the stator 276 is arranged such that it is seated fixedly on the bearing casing 18, in particular in the support body 266.

In this arrangement, the stator windings of the stator 276 are connected by way of connection lines 292, 294 to a terminal feedthrough 302 that is arranged in, and closes off, an aperture 304 in the bearing casing 18, with the result that, in order for the stator windings of the stator 276 of the speed sensor 270 to make contact, there are available two contacts 312 and 314 that lie outside the bearing casing 18 and are connected to the lines 292, 294 that lead to the stator windings of the stator 276.

Because the sensor generator 272 that forms the speed sensor 270 has a permanently magnetized sensor rotor 274, the speed sensor 270 generates, as the sensor signal, a voltage that is proportional, in particular strictly proportional, to the speed of the screw rotor 36.

Preferably here, the sensor generator 272 having the sensor rotor 274 and the stator 276 is configured such that, when the screw rotor 36 is coupled to the electrical motor/generator unit that is designated 132 and is operated at an AC voltage with a frequency corresponding to a grid frequency of an electrical power supply 320 coupled to the motor/generator unit 132, for example 50 Hz or 60 Hz, the sensor generator 272 generates as a sensor signal an electrical voltage below 48 V but preferably in the range between 30 V and 48 V, or even better in the range between 40 V and 48 V, in order to be able to measure the speed of the screw rotor 36, in particular the common drive shaft 138, in the range of the relevant grid frequency on the one hand as precisely as possible—that is to say by a sensor signal having as high a voltage as possible—but on the other hand avoiding the use of high-voltage components that would have to be used at voltages above 48 V.

A particularly advantageous solution provides for the sensor generator 272 to be a standard generator having a permanently magnetized rotor 274.

In particular here, the voltage generated by the sensor generator 272 may be either an AC voltage or a DC voltage that can be measured directly, that is to say without any electrical conversion.

In this way, both when using the machine according to the invention for expanding substantially gaseous media and also when using the machine according to the invention for compressing substantially gaseous media with the speed sensor 270, it is advantageously possible to detect the speed of the electrical motor/generator unit that is designated 132 as a whole.

The invention claimed is:

1. A machine for depressurizing or compressing substantially gaseous media, comprising:
    a machine casing;
    at least one screw rotor, which is arranged in a screw rotor bore in the machine casing, extends between a low-pressure side and a high-pressure side of the screw rotor bore, cooperates with the substantially gaseous medium and, by rotating about a screw axis, conveys the substantially gaseous medium either from the low-pressure side to the high-pressure side, compressing it, or from the high-pressure side to the low-pressure side, expanding it, and is mounted on both sides in the machine casing by means of a respective bearing set, each bearing set has at least one radial bearing and at least one of the bearing sets has at least one axially acting bearing that supports the at least one screw rotor axially to counter an axial displacing movement from its operating position in the direction of the low-pressure side; and
    a motor/generator unit that is coupled or couplable to the at least one screw rotor, the at least one screw rotor is provided with at least one axial support bearing that axially supports the at least one screw rotor such that a high-pressure end face of the at least one screw rotor is guided, without making contact, to an end wall, which faces this end face, of the machine casing that receives the at least one screw rotor;
    wherein the at least one support bearing is arranged on a receiving pin.

2. The machine as claimed in claim 1, wherein the at least one support bearing is arranged to be movable in the axial direction in the machine casing and such that it is urged by force in the direction of the low-pressure side.

3. The machine as claimed in claim 2, wherein the at least one support bearing acts on the screw rotor in the axial direction such that the axially acting bearing is constantly biased in the direction of the low-pressure side by the support bearing.

4. The machine as claimed in claim 3, wherein the at least one support bearing is urged by a resilient spring force acting in the axial direction, such that the spring force acts on the at least one screw rotor in the direction of the low-pressure side.

5. The machine as claimed in claim 2, wherein the at least one support bearing is urged by a disk spring set.

6. The machine as claimed in claim 1, wherein the at least one support bearing acts on a bearing pin on which the at least one screw rotor is mounted.

7. The machine as claimed in claim 6, wherein the at least one support bearing acts on the bearing pin that is arranged on the side of the at least one screw rotor that is remote from the motor/generator unit.

8. The machine as claimed in claim 7, wherein the at least one support bearing is arranged in a bearing casing of the machine casing that is arranged such that it is remote from the motor/generator unit.

9. The machine as claimed in claim 6, wherein the at least one support bearing acts on a bearing pin that projects beyond the end face of the screw rotor on the high-pressure side.

10. The machine as claimed in claim 1, wherein the receiving pin is arranged at an end of a bearing pin.

11. The machine as claimed in claim 1, wherein the receiving pin has a flange face on which the support bearing acts.

12. The machine as claimed in claim 1, wherein the receiving pin is inserted into the end of the bearing pin.

13. The machine as claimed in claim 1, wherein the receiving pin is centered in relation to the bearing pin by a centering cone.

14. The machine as claimed in claim 1, wherein the receiving pin has a smaller diameter than a pin section of the bearing pin that carries the respective bearing set, wherein the bearing set includes the radial bearing and/or the axially acting bearing.

15. The machine as claimed in claim 1, wherein the at least one support bearing is dimensioned such that the support forces to be taken up thereby are in the range of from 10% to 80% of the support forces of the axially acting bearing.

16. The machine as claimed in claim 1, wherein the at least one support bearing has, in relation to the respective screw axis, a radial extent in the range of from 10% to 80% of the radial extent of the axially acting bearing.

17. The machine as claimed in claim 1, wherein the at least one support bearing has a bearing internal diameter that is smaller than an internal diameter of the axially acting bearing of the respective bearing set.

18. The machine as claimed in claim 1, wherein the at least one support bearing has a bearing internal diameter that is smaller than an internal diameter of the radial bearing of the bearing sets.

* * * * *